Sept. 30, 1941.   N. M. McCULLOUGH   2,257,615
LOW SPEED ACCELERATION SAFETY DEVICE
Filed Jan. 22, 1938   3 Sheets-Sheet 2
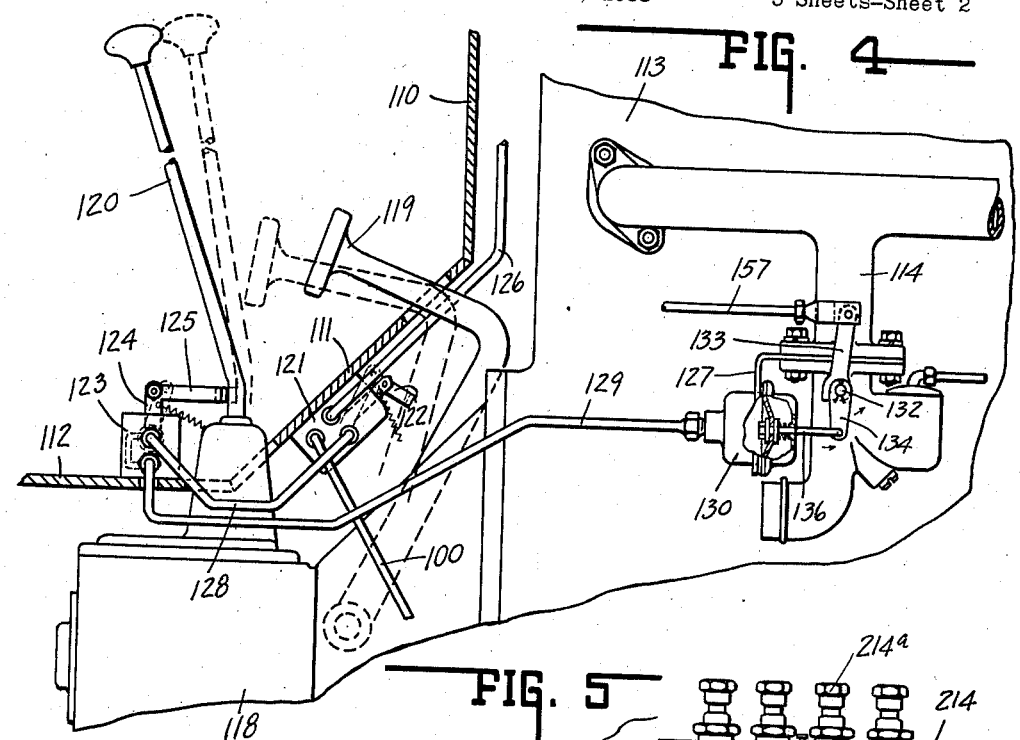
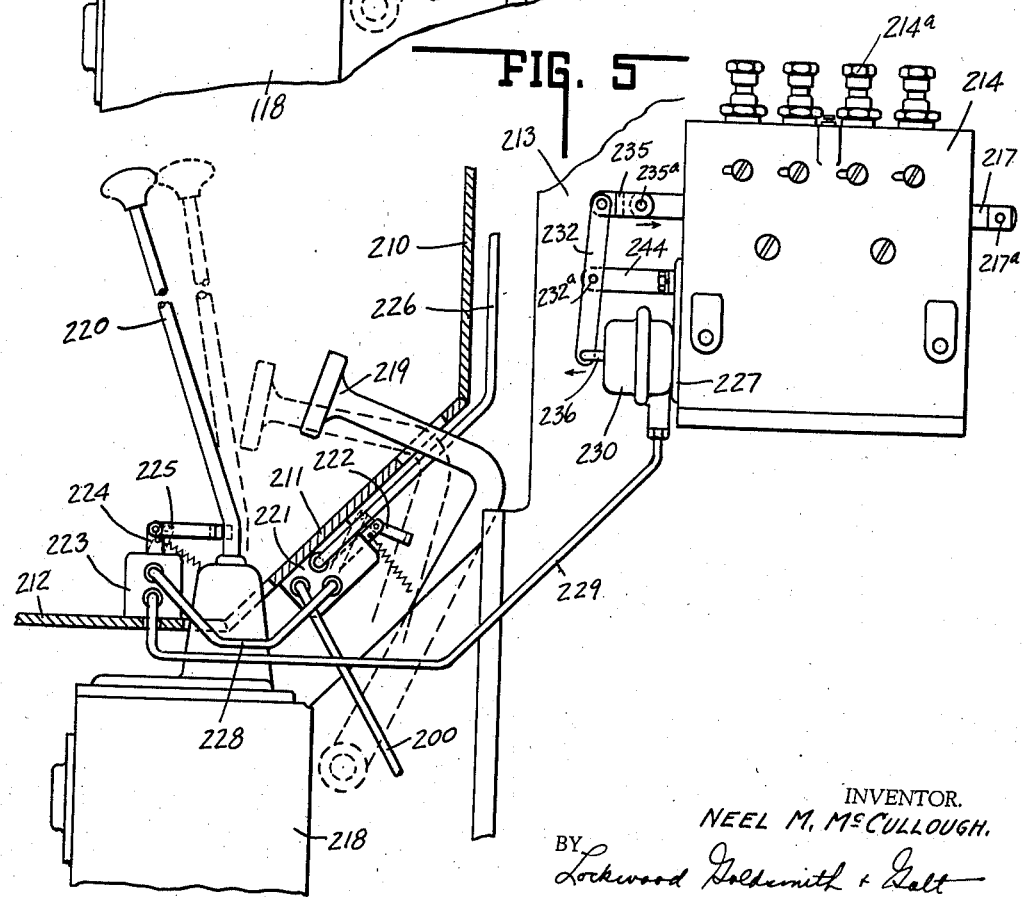
INVENTOR.
NEEL M. McCULLOUGH.
BY Lockwood Galdsmith & Galt
ATTORNEYS.

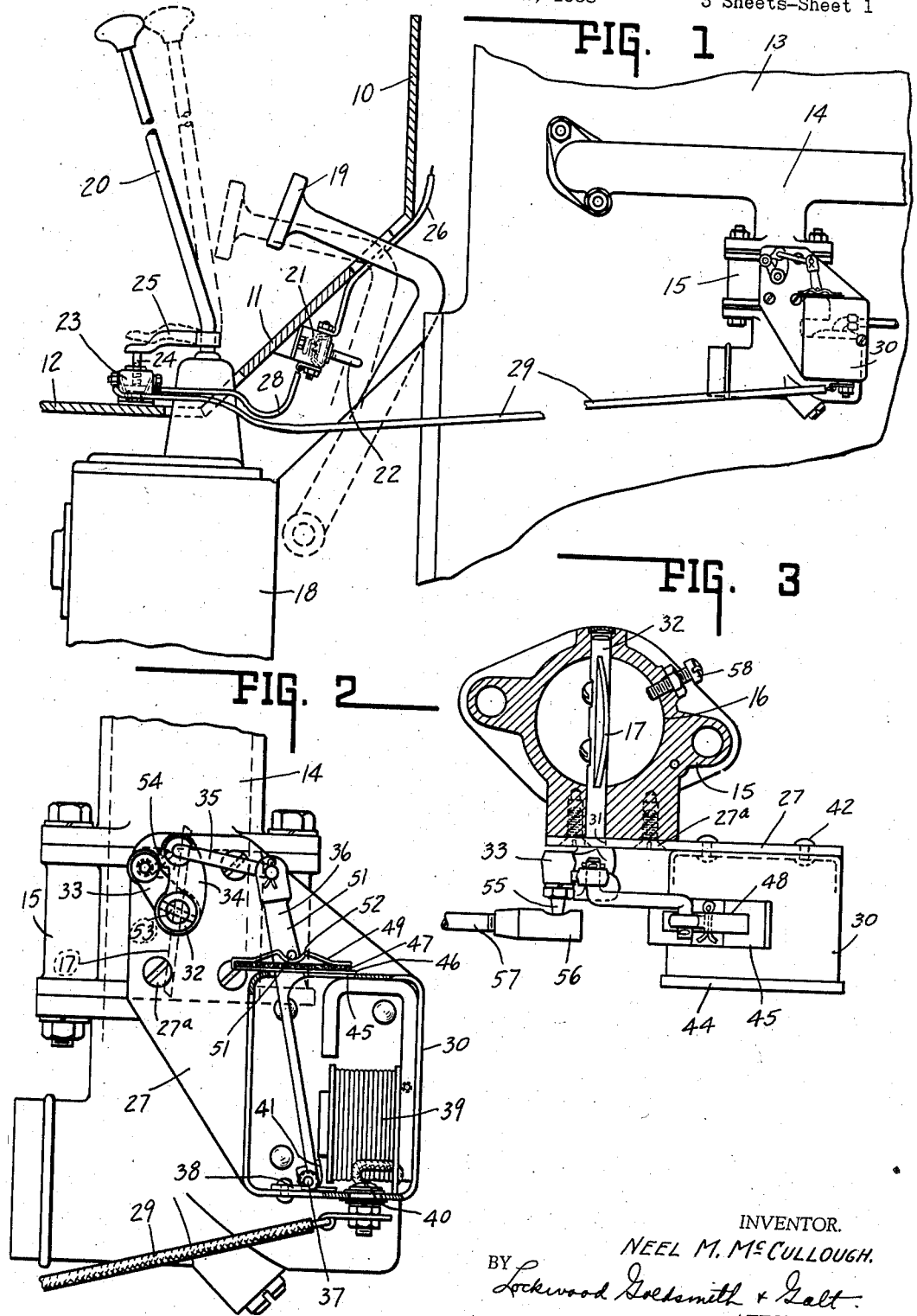

Sept. 30, 1941.   N. M. McCULLOUGH   2,257,615
LOW SPEED ACCELERATION SAFETY DEVICE
Filed Jan. 22, 1938   3 Sheets-Sheet 3
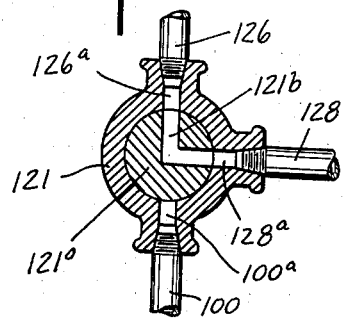
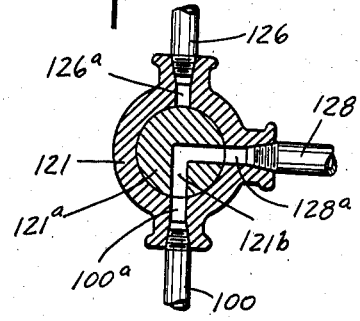
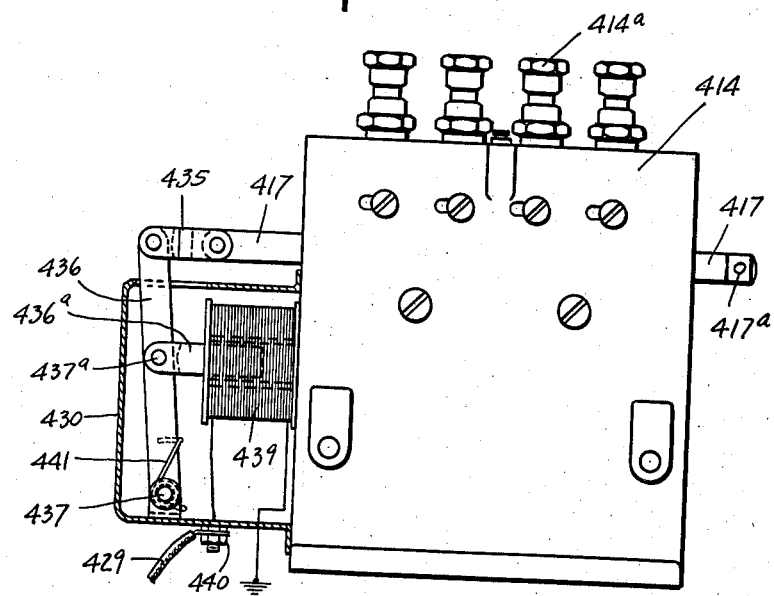
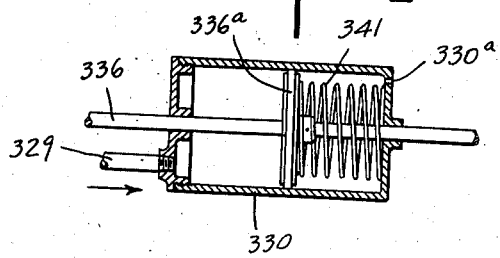
INVENTOR.
NEEL M. McCULLOUGH.
BY Lockwood Goldsmith & Galt
ATTORNEYS.

Patented Sept. 30, 1941

2,257,615

UNITED STATES PATENT OFFICE 2,257,615

LOW SPEED ACCELERATION SAFETY DEVICE

Neel M. McCullough, Anderson, Ind., assignor to The Pierce Governor Company, Anderson, Ind., a corporation Application January 22, 1938, Serial No. 186,347

20 Claims. (Cl. 192—.01)

This invention relates to an interlocking system for self-propelled vehicles and which is peculiarly effective if applied to the same when the power plant is located at the rear of said vehicle, such as in busses, trucks, and the like, or when the power plant is so insulated from the driver's position that the audible sound of engine operation cannot be heard by the driver.

The chief object of the invention is to prevent stalling of the motor and/or rapid wearing of the clutch particularly in the starting of such a heavy motor vehicle.

It has been determined that every driver when preparing to start the movement of a heavy vehicle accelerates the prime mover when he releases the clutch pedal for clutch engagement. If the engine speed be insufficient, the inertia of the load stalls the engine. If the engine speed be excessive, grabbing of the clutch results. This soon requires clutch repair or replacement. One company's experience with rear mounted engines has been that the clutches require renewal of the facings, et cetera, approximately every fifteen hundred miles. This condition, it is obvious, is entirely unsatisfactory for continuous and economical heavy vehicle operation.

These operating conditions prevail because vehicle drivers depend upon their sense of hearing to determine the proper time or instant to release the clutch for engagement corresponding to the desired engine speed sufficient to overcome the inertia of the load for the purpose of starting the movement of the vehicle and without stalling of the prime mover.

If it is assumed that the engine is operating at fast idle speed and the operator to start vehicle movement has released the clutch and shifted to low speed transmission position, the present invention then in its broadest sense is directed to the solution of the foregoing problem by utilizing an interlock arrangement preventing overspeeding of the engine prior to clutch engagement or more especially during the act of engaging the clutch.

The chief feature of the invention consists in associating with the engine a multiple type control, automatic in its operation in conjunction with the driver's usual operations to start the movement of the vehicle and which is applicable to forward or rearward mounted engines but is peculiarly effective, as stated, when the engines are mounted in the rear of such a vehicle and/or are so insulated as to sound so that the sound of engine operation is substantially inaudible to the driver of the vehicle.

The full nature of the invention will be understood from the accompanying drawings and the following description and claims.

In the drawings,

Fig. 1 is a semi-diagrammatic view of a motor vehicle equipped with one embodiment of the invention and wherein the engine is mounted at the front of the vehicle.

Fig. 2 is an enlarged elevational view of the engine control portion of the embodiment of the invention shown in Fig. 1 and with the cover plate removed.

Fig. 3 is a top plan view thereof, the intake portion being shown in transverse section.

Fig. 4 is a view similar to Fig. 1 and of a pressure type embodiment of the invention.

Fig. 5 is a view similar to Fig. 1 and of a pressure type Diesel engine embodiment of the invention.

Fig. 6 is an enlarged transverse sectional view of a control valve in one control position.

Fig. 7 is a similar view of said valve in another position.

Fig. 8 is a view similar to Fig. 5 of an electric type of Diesel embodiment of the invention, the clutch and gear shift mechanism being omitted therefrom.

Fig. 9 is a longitudinal sectional view of a piston and cylinder form of fluid pressure operable power means.

In Fig. 1 of the drawings there is illustrated a portion of a bus, truck or similar vehicle, which includes in the forward portion a driver's compartment having the dash 10, the toe-board 11 and the floor-board 12. Therein is positioned operating portions of the clutch pedal 19 and the gear shift lever 20. Other equivalent types of controls may be substituted therefor, as is well known in the automotive industry today. 13 indicates an internal combustion engine having the intake 14 for supplying fuel mixture thereto. An adaptor 15 includes a fuel intake passage 16 with a control valve 17 therein adapted for manual operation or if desired governor operation in the usual manner.

The control for this valve may be of oil pressure operable, vacuum operable, electric operable or electro vacuum operable type but said control includes two control stations, one associated with the gear shifting mechanism and the other associated with the clutch mechanism, both mechanisms having to be in the required position before subsequent engine acceleration operation can be effected, if the mechanisms are arranged for vehicle movement. Herein the embodiment of the invention selected for initial illustration in Figs. 1, 2 and 3 is of electrical character, since electrical apparatus is easier to install and maintain in operative condition.

By an electro-vacuum type of control embodiment, reference is made to the basic disclosures found in the following Neel M. McCullough applications: Serial No. 91,213, filed July 17, 1936; Serial No. 93,800, filed Aug. 1, 1936; Serial No. 100,650, filed Sept. 14, 1936, now Patents No. 2,169,267, No. 2,142,403 and No. 2,169,268, respectively, and more especially Figs. 4 and 5 of the first mentioned application, and said applications are made a part hereof for the sole purpose of illustrating or exemplifying an electro-vacuum embodiment of the control mechanism.

The arrangements shown in said applications, when applied to the present invention, would include two stations, each for controlling the common circuit, one station operable automatically in the clutch mechanism operation and the other station automatically operable in the operation of the gear shifting mechanism, as hereinafter described.

Herein the invention is illustrated in Figs. 1, 2 and 3, by way of example only, as of the attachment type, one connection being to the gear shift lever and the other connection being to the clutch pedal. These stations, however, may be otherwise associated with these primary mechanisms, as desired or required, and may even be built into these mechanisms or their very well known present day equivalents.

In Fig. 1, 18 indicates the transmission, 19 the clutch pedal and 20 the gear shift lever. A switch structure 21 is mounted on the underside of the toe-board 11 in juxtaposition to the clutch pedal lever 19 and has a stem or switch operating member 22 adapted for pedal engagement when the pedal is released and is disassociated therefrom when the pedal is depressed for clutch release.

Adjacent the gear shift lever 20 is a switch structure 23 having a stem or operating member 24. A contact member 25 is rigidly secured to the gear shift lever 20 so that member 25 engages stem or member 24 and depresses the latter only when the gear shift lever 20 is in the low gear or first speed position, since this is the critical position.

A circuit forming member 26 leads from the wiring junction box or terminal plate (common to automotive vehicles) to the switch 21. When the clutch pedal is in the dotted line position (clutch engaged position) the circuit through the switch 21 is broken. When the pedal is depressed (clutch release position) the circuit through the switch 21 is closed. Circuit member 28 leads from switch structure 21 to switch structure 23 and circuit member 29 leads from switch structure 23 to the automatic control designated generally by 30 in Fig. 1.

The stems or operating members 22 and 24 are preferably adjustably associated with their respective switch structure interiors. The details of this, however, are not illustrated herein. The purpose of this adjustment is not only for universal adaptation to various vehicles but more especially so that proper switch operation from switch 23 can be obtained after clutch pedal adjustment has been effected as is quite common in order to maintain the clutch and its control mechanism in the desired operative condition. This adjustment also is for the purpose of insuring the breaking of the circuit through this switch 21 in predetermined timed relation, to-wit, just previous to actual clutch engagement. Thus the circuit control is timed for operation relative to power control operation. Of course, each switch structure includes a suitable constraining spring or the equivalent for conditioning the switches as described.

From the foregoing, it is apparent the circuit through the lines 26—28—29 is only complete when the lever 19 is depressed and the gear shift lever 20 is in the low speed position and this circuit is open whenever the clutch is in the engaged position or the gear shift lever is in the neutral or in position other than that of the low speed position, and furthermore, the circuit is opened just prior to clutch engagement.

Reference will now be had more especially to Figs. 2 and 3. Adaptor 15 supports the plate 27 as at 27a. It is apertured as at 31 and the shaft 32 which supports valve 17 extends through said aperture.

The projecting end of the shaft supports two lever arms 33 and 34. Arm 34 is connected by link 35 to arm 36 rigid with the rock shaft 37 and said arm in effect constitutes the armature or keeper for an electro-magnet 39. The shaft 37 is suitably supported in the housing, designated by the numeral 30, as at 38. Electro-magnet 39 has one terminal 40 connected to the circuit member 29. A torsion spring 41 is of return spring character and returns the lever 36 to the position shown in Fig. 2 when the circuit to the electro-magnet is broken. The housing 30 before mentioned is secured to the plate 27 as at 42 and includes a cover 44 and is slotted as at 45. The housing encloses the electro-magnet, keeper, et cetera, although the arm 36 extends therefrom by way of the slot 45.

A slot seal may be employed, if desired. One form shown herein includes a U-shaped plate 46, see Fig. 2, between the arms of which is secured the seal material 47, the same being clamped therebetween. The upper arm of this U-shaped member 46 is slotted as at 48, see Fig. 3, and the two side portions 49 straddle the arm 36 and include a depressed or pocket forming portion 52. A pin 51 extends through an aperture 50 in the member 36 and the opposite projecting ends seat in the pocket portions 52. Thus, the plate type seal moves with the arm 36 and closes the opening 45 at all times. Arm 34 is pinned to valve shaft 32 at 53 and includes the abutment 54.

Lever 33 includes the ball extension 55 for connection to a socket member 56 upon the end of an actuating member 57 that may be manually or governor actuated or controlled.

When the electro-magnet 39 is energized, the valve 17 is closed to the desired degree to prevent over acceleration of the engine. To prevent complete closing of the valve, an adjustable stop 58—see Fig. 3—is provided.

When the electro-magnet is not energized, spring 41 tends to return arm 36, link 35 and lever 34 as well as the valve 17 to full, open or throttle adjusted position. If the device be governor controlled as well, member 57 when actuated by suitable governor mechanism engages the abutment 54 and closes the valve to the desired degree so that overspeeding of the vehicle is prevented in normal running position. When the vehicle speed or the engine speed falls below that for which the governor is adjusted, the arm 33 is returned counterclockwise and since it is loose on the shaft 32, the lever 34 follows the same due to the spring 41 before mentioned, or a spring connection between arms 33 and 34, not shown.

It will, therefore, be understood from the foregoing that when the gear shift lever is in neutral position, the engine is started. When moved to low or first speed position, the switch 23 is closed. When the clutch pedal 19 is depressed for clutch release or disengagement necessary for gear shifting or starting, the switch 21 is closed. This results in both switches being closed and, therefore, current is supplied to the electromagnet 39 for energization thereof and operation of the mechanism shown more particularly in Figs. 1, 2 and 3, so that the fuel mixture control valve 17 moves to the adjusted engine idling position determined by the stop 58.

If the driver of the vehicle is over accelerating through the manual throttle, not shown, or member 57, the aforesaid control prevents engine operation greater than at the idling speed. As the driver releases the clutch pedal 19 just prior to clutch engagement, the control imposed upon the fuel supply by means of the valve 17 is removed and then the driver's attempted acceleration of the engine becomes effective and operative for speeding up the engine simultaneously with clutch engagement, thereby preventing grabbing of the clutch and/or stalling of the engine due to load inertia.

Having thus described one embodiment of the invention and the operation, a detailed explanation of the same with reference to other embodiments of the invention now to be described will be omitted since it is believed, this will suffice so that no repetition other than a brief reference thereto will be necessary hereinafter.

In Fig. 4 of the drawings, numerals of the one hundred series similar to the prime numerals, utilized in Fig. 1, designate like or equivalent parts.

In Figs. 4, 6 and 7 there is illustrated a pressure type form of the invention and in this form 121 designates a valve structure having a member 122 adapted for engagement by the clutch pedal 119 and 123 indicates another valve member having portion 124 associated with member 125 adapted for engagement by the gear shift lever 120 when in the low or first speed position.

Numeral 126 designates an oil pressure supply line leading from the oil pump or some other convenient source of pressure. This may be compressed air, if there be a source of air pressure on the vehicle such as is frequently the case with large vehicles which are provided with so-called air brakes. The pressure is supplied by line 126 to the valve 121 and when the pedal is in the depressed position, the valve is so arranged that it supplies pressure to the line 128. When the gear shift lever is in the low speed position, the pressure supplied by line 128 is communicated to line 129 and supplied to a diaphragm structure 130 supported by member 127, in turn supported by a portion of the intake to the engine.

The diaphragm structure 130 includes an operating stem 136 which is connected to lever 134 carried by valve operating shaft 132. Lever 133 is suitably associated therewith and is operable by control member 157, either governor or manually controlled, all as similarly described with reference to the members 57, 33 and 34 illustrated in Figs. 1, 2 and 3. The diaphragm structure includes a spring, if the diaphragm therein is not of inherent resiliency, so that it is normally constrained toward one position and moved into the opposite position by means of the pressure supplied by line 129. This spring tends to return such a diaphragm not so inherently constrained to the original position.

It will be quite apparent from the aforesaid that when the clutch pedal is released, the pressure supplied by line 126 is cutoff. This cutoff occurs just before clutch engagement occurs. In other words, the same time cycle or relation as previously mentioned, is obtained in this form of the invention.

With this form of the invention, when the valve actuating member 122 is engaged by the clutch pedal lever 119 when the latter is released, see dotted lines in Fig. 4, there is a pressure included in the lines 128 and 129 and the diaphragm apparatus 130. Line 100, therefore, is provided to relieve this pressure. Otherwise, the control imposed upon the fuel supply would be maintained. Such relief is obtained as follows:

The vehicle is always, after the gear shift lever has been positioned in the low speed position, operated for a slight interval of time in low speed relationship, and it is during this interval the valve 123 maintains communication between conduits 129 and 128, and during this interval of communication following cutting off of fuel pressure supply from line 126 to line 128 that the trapped oil under pressure is caused to be discharged in a reverse direction from the diaphragm structure 130, line 129, valve 123, line 128 through valve 121 to the return line 100.

In Figs. 6 and 7, Fig. 6 illustrates the body portion 121a of the valve, indicated generally by 121, as provided with an angular channel 121b adapted to register with ports 126a and 128a in the valve body, and which communicate respectively with the conduits 126 and 128. This represents the condition when the clutch pedal is depressed and the clutch disengaged. When the clutch pedal is released and the clutch is engaged, the valve is automatically returned to the position shown in Fig. 7, in which there is illustrated the relief communication including the additional port 100a in communication with conduit 100, the same then being in communication with the conduit 128 through the passage 121b and port 128a.

It is not essential that all of the oil be discharged. It is only essential that the pressure be relieved and naturally having once been relieved through the line 100 and no further pressure being supplied, the pressure control imposed upon the diaphragm is released. This releases the control device for normal operation. At the appropriate time, the operator of the vehicle again depresses the clutch pedal and shifts the gear shift lever into neutral or another speed position which, of course, then breaks the communication through the valve 123 between the lines 128 and 129.

In Fig. 5 a modified form of the invention is illustrated wherein the same fluid pressure system form of the invention is illustrated. Numerals of the two hundred series indicate like or equivalent parts. In this form of the invention in place of the fuel controlling system for an internal combustion engine of the gasoline type, there is illustrated a Diesel engine 213 equipped with a fuel pump structure 214 of conventional character and provided with a rack bar or control member 217. The fuel is supplied to the engine 213 represented as including four cylinders, not shown, by means of the four fuel supply lines to said cylinders and indicated by the numeral 214a.

The diaphragm structure herein indicated by 230 is of substantially the same character as that previously described and indicated by 130 in Fig. 4. The operating member 236 is connected to a lever 232 connected by means of a link 235 to the rack bar 217 at 235a. Movement of the rack bar 217 to the right insures reduction of the fuel supply. Movement of the rack bar to the left insures increase of fuel supply. The end 217a of the rack bar may be arranged for manual control or automatic control, or both.

Portion 235a may serve as a stop to limit the throttle position imposed by the pressure control. The lever 232 is pivotally supported at 232a upon the arm 244 rigid with the plate 227 supporting the diaphragm 230. The operation of the device is substantially that previously described with reference to Fig. 4 but is applied to a Diesel engine as the prime mover of the vehicle.

In Fig. 9 there is illustrated a cylinder and piston type of pressure power which may be readily substituted for the diaphragm type of pressure power shown in Figs. 4 and 5. In Fig. 9 numerals of the three hundred series indicate like or equivalent parts. The pressure supply line is 329, the cylinder is 330, the operating member or piston rod is 336. The return spring is indicated by 341 and the piston by 336a. The cylinder has the release port 330a. Connection to the rod 336 may be at either end, as it will be noted that the diaphragm structure 130 in Fig. 4 has the operating member 136 extending to the right while the diaphragm structure 230 in Fig. 5 has the operating member 236 extending to the left.

In Fig. 8 there is illustrated a modified form of the invention, wherein numerals of the four hundred series indicate like or equivalent parts. This form of the invention is an electric type control for the fuel pump of a Diesel engine. The current supply line is indicated by 429 and connecting to the terminal 440 of the solenoid magnet 439 enclosed within the housing 430.

The housing 430 is suitably supported upon or adjacent the fuel pump 414. A core 436a is pivoted at 437a to lever 436. Lever 436 is pivoted at 437. A spring 441 normally constrains the lever 436 to its remote position relative to the solenoid magnet. The lever 436 has its free end connected to link 435, connected to rack bar 417 of the fuel pump 414 having fuel supply lines 414a. The operation of the fuel pump is substantially the same as that previously described with reference to that illustrated in Fig. 5. The current supply is effected in substantially the same manner as the current supply is effected with reference to the form of the invention shown in Figs. 1 to 3, inclusive.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A transmission protective arrangement for multi-speed self-propelled vehicles having a prime mover, a multi-positionable speed changing mechanism having a control member movable into a plurality of positions and a clutch mechanism having a control member movable into a plurality of positions, including in combination a pair of control means, a control for the prime mover fuel supply, and means connecting said control means and control in series, one control means being juxtapositioned relative to the control member of one mechanism for automatic operation therewith and the other control means being similarly positioned relative the control member of the other mechanism for automatic operation therewith, said fuel control being responsive to reduce the fuel supply to a predetermined amount or prevent increase of the fuel supply above that amount when the first mentioned control member is in one of said positions and the other control member is in one of its positions and during an appreciable portion of movement into another position to prevent dangerous acceleration of the prime mover immediately prior to clutch engagement.

2. An arrangement as defined by claim 1, characterized by the control means being of electric switch character and the connecting means being of electric circuit character.

3. An arrangement as defined by claim 1, characterized by the control means being of valve character and the connecting means being conduit means.

4. An arrangement as defined by claim 1, characterized by the control means being of valve character and the connecting means being conduit means, and by the addition of a pressure relief line, one of said valve control means being arranged to connect the relief line to the conduit means for the purpose described.

5. An arrangement as defined by claim 1, characterized by the clutch mechanism operation of the associated control means occurring at least simultaneously with or immediately prior to clutch engagement for removing the protection.

6. An arrangement as defined by claim 1, characterized by the control means being of valve character and the connecting means being conduit means, said control including a diaphragm structure.

7. An arrangement as defined by claim 1, characterized by the control means being of valve character and the connecting means being conduit means, and by the addition of a pressure relief line, one of said valve control means being arranged to connect the relief line to conduit means for the purpose described, said control including a diaphragm structure.

8. An arrangement as defined by claim 1, characterized by the control means being of valve character and the connecting means being conduit means, said control including a piston and cylinder structure.

9. An arrangement as defined by claim 1, characterized by the control means being of valve character and the connecting means being conduit means, and by the addition of a pressure relief line, one of said valve control means being arranged to connect the relief line to conduit means for the purpose described, said control including a piston and cylinder structure.

10. In a vehicle, the combination with a fuel control system for the prime mover thereof, including an operating member, a gear shift lever, and a clutch pedal, of a control means positioned adjacent the gear shift lever and automatically operable in the movement thereof into and out of a predetermined position, another control means positioned adjacent the clutch pedal and automatically operable in the movement thereof into and out of clutch engaging position, means connecting said control means in series, power means operatively connected to the operating member for operation thereof, and means connecting the last of the series connected control means to the power means for operation of the latter, said fuel control operating member being responsive to reduce the fuel supply to a predetermined amount or prevent increase of fuel supply above that amount when the gear shift lever is in the predetermined position and the clutch pedal is in clutch disengaged position and during an appreciable portion of the pedal movement toward clutch engaging position to prevent dangerous acceleration of the prime mover immediately prior to clutch engagement.

11. An arrangement as defined by claim 10, characterized by the control means being of electric switch character and the connecting means being of electric circuit character.

12. An arrangement as defined by claim 10, characterized by the control means being of valve character and the connecting means being conduit means.

13. An arrangement as defined by claim 10, characterized by the control means being of valve character and the connecting means being conduit means, and by the addition of a pressure relief line, one of said valve control means being arranged to connect the relief line to the conduit means for the purpose described.

14. An arrangement as defined by claim 10, characterized by the control means being of valve character and the connecting means being conduit means, said power means including a diaphragm structure.

15. An arrangement as defined by claim 10, characterized by the control means being of valve character and the connecting means being conduit means, and by the addition of a pressure relief line, one of said valve control means being arranged to connect the relief line to the conduit means for the purpose described, said power means including a diaphragm structure.

16. An arrangement as defined by claim 10, characterized by the control means being of valve character and the connecting means being conduit means, said power means including a piston and cylinder structure.

17. An arrangement as defined by claim 10, characterized by the control means being of valve character and the connecting means being conduit means, and by the addition of a pressure relief line, one of said valve control means being arranged to connect the relief line to the conduit means for the purpose described, said power means including a piston and cylinder structure.

18. An arrangement as defined by claim 10, characterized by the clutch pedal operating the adjacent control means immediately prior to clutch engagement.

19. An arrangement as defined by claim 10, characterized by the clutch pedal operating the adjacent control means immediately prior to clutch engagement, both control means being of switch character and the connecting means being of electric circuit character.

20. An arrangement as defined by claim 10, characterized by the clutch pedal operating the adjacent control means immediately prior to clutch engagement, both control means being of valve character and the connecting means being conduit means.

NEEL M. McCULLOUGH.